(12) United States Patent
Ishikawa et al.

(10) Patent No.: US 11,777,364 B2
(45) Date of Patent: Oct. 3, 2023

(54) DRIVE DEVICE AND VEHICLE

(71) Applicant: Nidec Corporation, Kyoto (JP)

(72) Inventors: Yuki Ishikawa, Kyoto (JP); Hitoshi Kuroyanagi, Kyoto (JP); Naohiro Wada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 146 days.

(21) Appl. No.: 17/519,819

(22) Filed: Nov. 5, 2021

(65) Prior Publication Data
US 2022/0158523 A1 May 19, 2022

(30) Foreign Application Priority Data

Nov. 19, 2020 (JP) .................................. 2020-192836
Apr. 15, 2021 (JP) .................................. 2021-068948

(51) Int. Cl.
| | | |
|---|---|---|
| *H02K 5/20* | (2006.01) | |
| *B60L 53/22* | (2019.01) | |
| *F16H 57/02* | (2012.01) | |
| *F16H 57/04* | (2010.01) | |
| *H02K 11/33* | (2016.01) | |

(Continued)

(52) U.S. Cl.
CPC ............. *H02K 5/203* (2021.01); *B60L 53/22* (2019.02); *F16H 57/02* (2013.01); *F16H 57/043* (2013.01); *F16H 57/0417* (2013.01); *F16H 57/0424* (2013.01); *F16H 57/0436* (2013.01); *F16H 57/0476* (2013.01); *H02K 7/116* (2013.01); *H02K 9/193* (2013.01); *H02K 11/33* (2016.01); *H02K 21/16* (2013.01); *B60K 2001/001* (2013.01); *F16H 2057/02034* (2013.01); *F16H 2057/02052* (2013.01)

(58) Field of Classification Search
CPC ........ H02K 5/203; H02K 7/116; H02K 9/193; H02K 11/33; H02K 21/16; H02K 1/32; H02K 5/1732; H02K 7/006; H02K 9/19; B60L 53/22; F16H 57/02; F16H 57/0417; F16H 57/0424; F16H 57/043; F16H 57/0436; F16H 57/0476; F16H 2057/02034; F16H 2057/02052; B60K 2001/001; B60K 1/00; B60K 11/02; B60K 2001/006; B60Y 2410/102; B60Y 2400/78; B60Y 2410/10; Y02T 10/70; Y02T 10/7072; Y02T 90/14
USPC .......................................................... 310/54
See application file for complete search history.

(56) References Cited

U.S. PATENT DOCUMENTS 7,156,195 B2 * 1/2007 Yamagishi .......... F16H 57/0476
310/60 A
11,608,883 B2 * 3/2023 Nakata ................ F16H 57/0424
(Continued)

*Primary Examiner* — John K Kim
(74) *Attorney, Agent, or Firm* — KEATING & BENNETT

(57) ABSTRACT

A gear portion of a drive device is connected to a motor shaft. An oil passage through which oil to cool a motor flows includes a first oil passage, a second oil passage, a third oil passage, and a fourth oil passage. The first oil passage connects a gear accommodation portion and a pump accommodation portion. The second oil passage connects the pump accommodation portion and an oil cooler. The third oil passage connects the oil cooler and the fourth oil passage. The fourth oil passage connects the third oil passage and a motor accommodation portion. Each of the first oil passage, the second oil passage, and the third oil passage is in a first housing portion. The fourth oil passage is in a third housing portion.

11 Claims, 8 Drawing Sheets

(51) Int. Cl.
*H02K 21/16* (2006.01)
*H02K 7/116* (2006.01)
*H02K 9/193* (2006.01)
*B60K 1/00* (2006.01)

(56) References Cited

U.S. PATENT DOCUMENTS

| | | | |
|---|---|---|---|
| 2011/0156509 A1* | 6/2011 | Minemura | H02K 9/19 |
| | | | 310/54 |
| 2014/0217842 A1* | 8/2014 | Kikuchi | H02K 9/19 |
| | | | 310/54 |
| 2016/0099633 A1 | 4/2016 | Yoshinori et al. | |
| 2016/0281740 A1* | 9/2016 | Mitsuda | H02K 5/203 |
| 2018/0334025 A1* | 11/2018 | Hashimoto | B60K 1/02 |
| 2019/0081537 A1* | 3/2019 | Kiyokami | F16H 57/043 |
| 2019/0173352 A1* | 6/2019 | Yamaguchi | H02K 9/19 |
| 2019/0225076 A1* | 7/2019 | Takeno | H02K 11/33 |
| 2019/0285165 A1* | 9/2019 | Hashimoto | B60W 20/10 |
| 2020/0028412 A1* | 1/2020 | Ikemoto | H02K 9/16 |
| 2022/0158523 A1* | 5/2022 | Ishikawa | H02K 21/16 |
| 2022/0282781 A1* | 9/2022 | Nakata | F16H 57/0483 |

* cited by examiner

DRIVE DEVICE AND VEHICLE

CROSS-REFERENCE TO RELATED APPLICATIONS

The present application claims priority under 35 U.S.C. § 119 to Japanese Patent Application No. 2020-192836 filed on Nov. 19, 2020 and Japanese Patent Application No. 2021-068948 filed on Apr. 15, 2021, the entire contents of which are hereby incorporated herein by reference.

1. FIELD OF THE INVENTION

The present disclosure relates to a drive device and a vehicle.

2. BACKGROUND

Conventionally, an electric motor mounted on a vehicle or the like is cooled by supply of a refrigerant such as cooled oil. For example, the refrigerant is supplied from a pump disposed outside the electric motor.

However, when a pipe through which the refrigerant circulates is disposed outside the casing of the electric motor, there is a possibility that the drive device increases in size and becomes difficult to dispose inside the vehicle.

SUMMARY

A drive device according to an example embodiment of the present disclosure includes a motor, a gear portion, a housing, a pump, and an oil cooler. The motor includes a rotor including a motor shaft, and a stator located radially outward of the rotor. The motor shaft is rotatable about a rotation axis extending along a horizontal direction. The gear portion is connected to one axial end portion of the motor shaft. The housing accommodates the motor and the gear portion. The pump supplies oil accommodated in the housing to the motor. The oil cooler cools the oil. The housing includes a first housing portion, a second housing portion, a third housing portion, a motor accommodation portion, a gear accommodation portion, a side plate opening, and an oil passage. The first housing portion includes a tubular portion extending in an axial direction parallel to the rotation axis, a side plate portion covering one axial end portion of the tubular portion, and a pump accommodation portion accommodating the pump. The second housing portion is attached to one axial end portion of the side plate portion. The third housing portion closes another axial end portion of the tubular portion. The motor accommodation portion is a space surrounded by the tubular portion, the side plate portion, and the third housing portion, and accommodates the motor. The gear accommodation portion is a space surrounded by the side plate portion and the second housing portion, and accommodates the gear portion. The side plate opening penetrates the side plate portion in the axial direction and connects the motor accommodation portion and the gear accommodation portion. The oil flows through the oil passage. The oil passage includes a first oil passage, a second oil passage, a third oil passage, and a fourth oil passage. The first oil passage connects the gear accommodation portion and the pump accommodation portion. The second oil passage connects the pump accommodation portion and the oil cooler. The third oil passage connects the oil cooler and the fourth oil passage. The fourth oil passage connects the third oil passage and the motor accommodation portion. Each of the first oil passage, the second oil passage, and the third oil passage is in the first housing portion. The fourth oil passage is in the third housing portion.

A vehicle according to an example embodiment of the present disclosure includes the drive device described above.

The above and other elements, features, steps, characteristics and advantages of the present disclosure will become more apparent from the following detailed description of the example embodiments with reference to the attached drawings.

DETAILED DESCRIPTION

Figure 1:
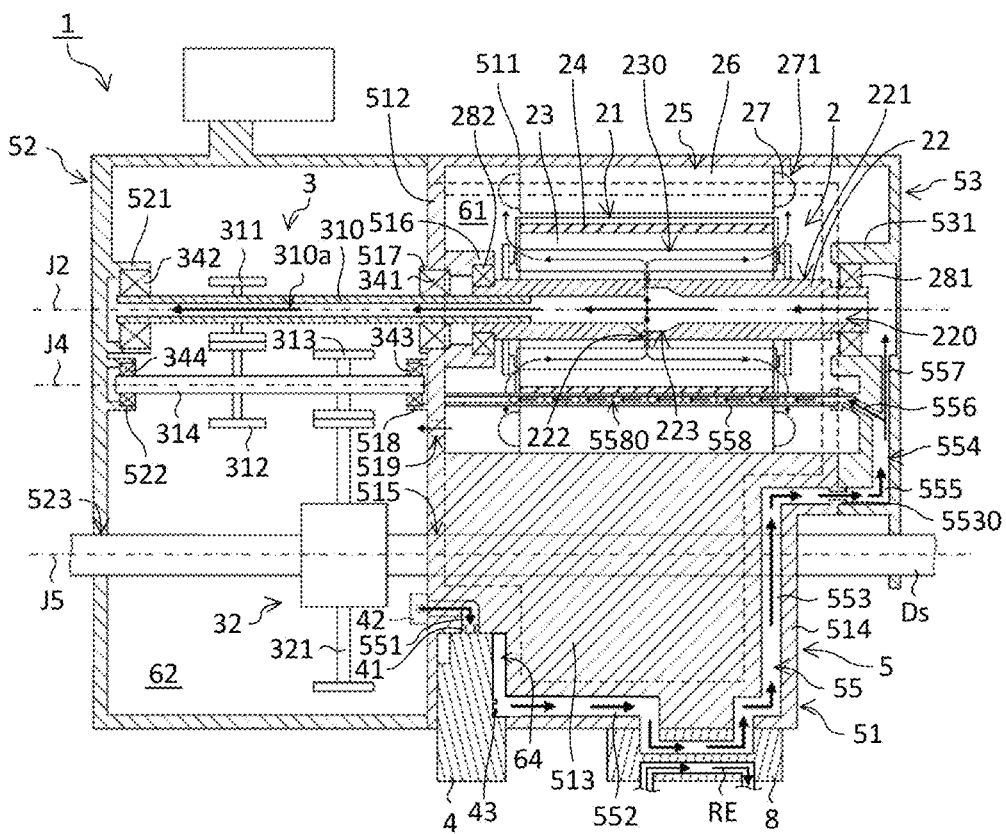
FIG. 1 is a schematic configuration view of a drive device according to an example embodiment of the present disclosure viewed from a vertical direction.

Example embodiments will be described below with reference to the drawings.

The following description will be made with the direction of gravity being partitioned based on a positional relationship in the case where a drive device 1 is mounted in a vehicle located on a horizontal road surface. In the drawings, an XYZ coordinate system is appropriately shown as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the gravity direction). The "vertical direction" in the following description is an example of the "second direction" of the present disclosure. Furthermore, "vertically upward" in the following description is an example of "one side in the second direction" of the present disclosure, and "vertically downward" in the following description is an example of "the other side in the second direction" of the present disclosure. In each component, an end portion upward is referred to as an "upper end portion", and the position of the upper end portion in the axial direction is referred to as an "upper end". An end portion downward is referred to as a "lower end portion", and the position of the lower end portion in the axial direction is referred to as a "lower end". Furthermore, on the surface of each component, the surface facing upward is referred to as an "upper surface", and the surface facing downward is referred to as a "lower surface".

The X axis direction is a direction orthogonal to the Z axis direction and shows the front-rear direction of the vehicle in which the drive device 1 is mounted. The "front-rear direction" in the following description is an example of the "third direction" of the present disclosure. The +X direction is the front of the vehicle, and the −X direction is the rear of the vehicle. However, the +X direction can be the rear of the vehicle, and the −X direction can be the front of the vehicle.

The Y axis direction is a direction orthogonal to both the X axis direction and the Z axis direction and indicates the width direction (right-left direction) of the vehicle. The +Y direction is the left of the vehicle, and the −Y direction is the right of the vehicle. However when the +X direction is the rear of the vehicle, the +Y direction can be the right of the vehicle, and the −Y direction can be the left of the vehicle. That is, regardless of the X axis direction, the +Y direction simply becomes one side in the right-left direction of the vehicle, and the −Y direction becomes the other side in the right-left direction of the vehicle. Depending on a method for mounting the drive device 1 on the vehicle, the X axis direction can be the width direction (right-left direction) of the vehicle, and the Y axis direction can be the front-rear direction of the vehicle. In the following example embodiment, the Y axis direction is parallel to, for example, a rotation axis J2 of a motor 2. Therefore, the Y axis direction is sometimes simply referred to as an "axial direction". The "Y axis direction" of the present example embodiment is an example of the "axial direction" of the present disclosure.

Unless otherwise specified in the following description, the direction (Y axis direction) parallel to a predetermined axis such as the rotation axis J2 of the motor 2 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Of the side surface of each component, a side surface facing radially inward is referred to as "radial inside surface", and a side surface facing radially outward is referred to as "radial outside surface".

In each component, an end portion in the circumferential direction is referred to as a "circumferential end portion". An end portion in one circumferential direction is referred to as "one circumferential end portion". Furthermore, an end portion in the other circumferential direction is referred to as "the other circumferential end portion". In addition, of the side surface of each component, a side surface facing the circumferential direction is referred to as a "circumferential side surface". Furthermore, the side surface facing the one circumferential side is referred to as "one circumferential side surface", and the side surface facing the other circumferential side is referred to as "the other circumferential side surface".

In a positional relationship between any one and another of the azimuth, the line, and the surface, "parallel" includes not only a state in which the two endlessly extend without intersecting at all but also a state in which the two are substantially parallel. The terms "perpendicular" and "orthogonal" each indicate not only a state in which the both intersect at 90 degrees with each other but also a state in which they are substantially perpendicular and a state in which they are substantially orthogonal. That is, the terms "parallel", "perpendicular", and "orthogonal" each include a state in which the positional relationship between both has an angular deviation that does not depart from the gist of the present disclosure.

Note that these are names used merely for description, and are not intended to limit actual positional relationships, directions, names, and the like.

Figure 2:
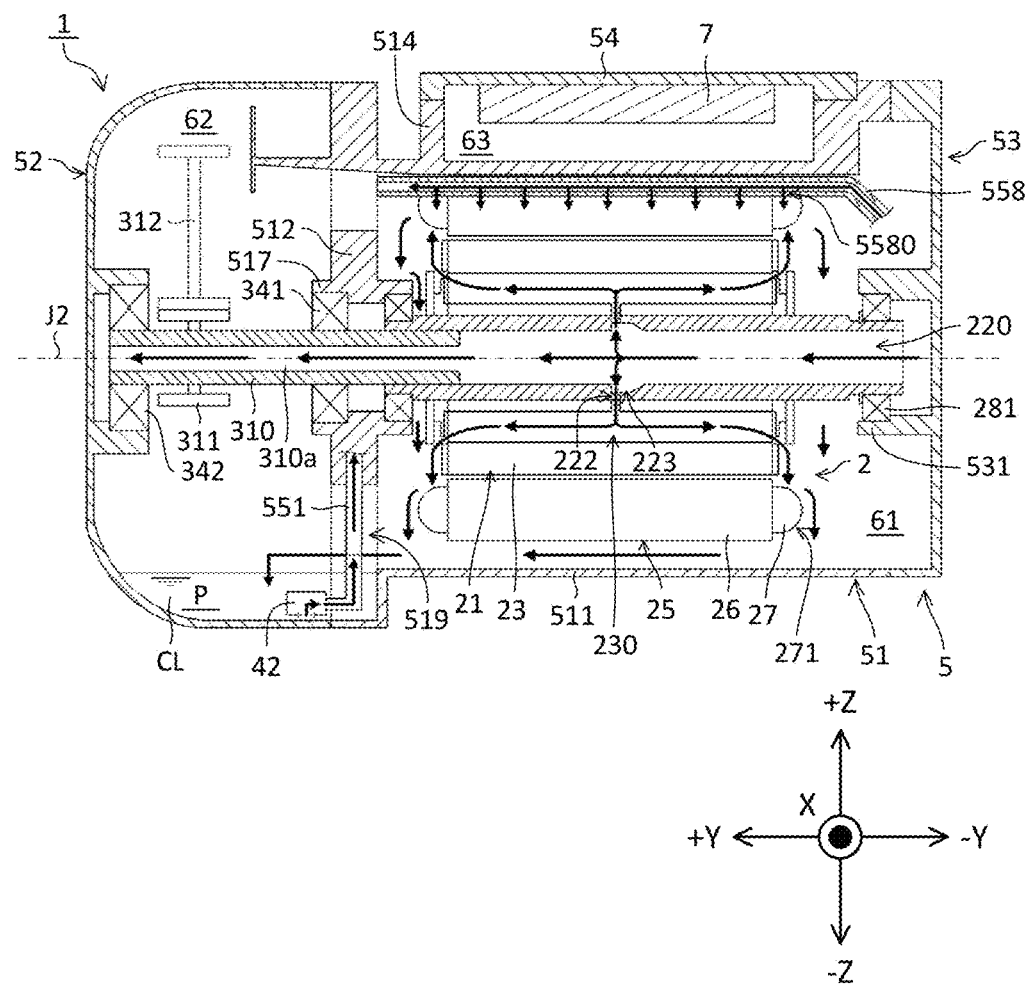
FIG. 2 is a schematic configuration view of the drive device viewed from an X axis direction.
Figure 3:
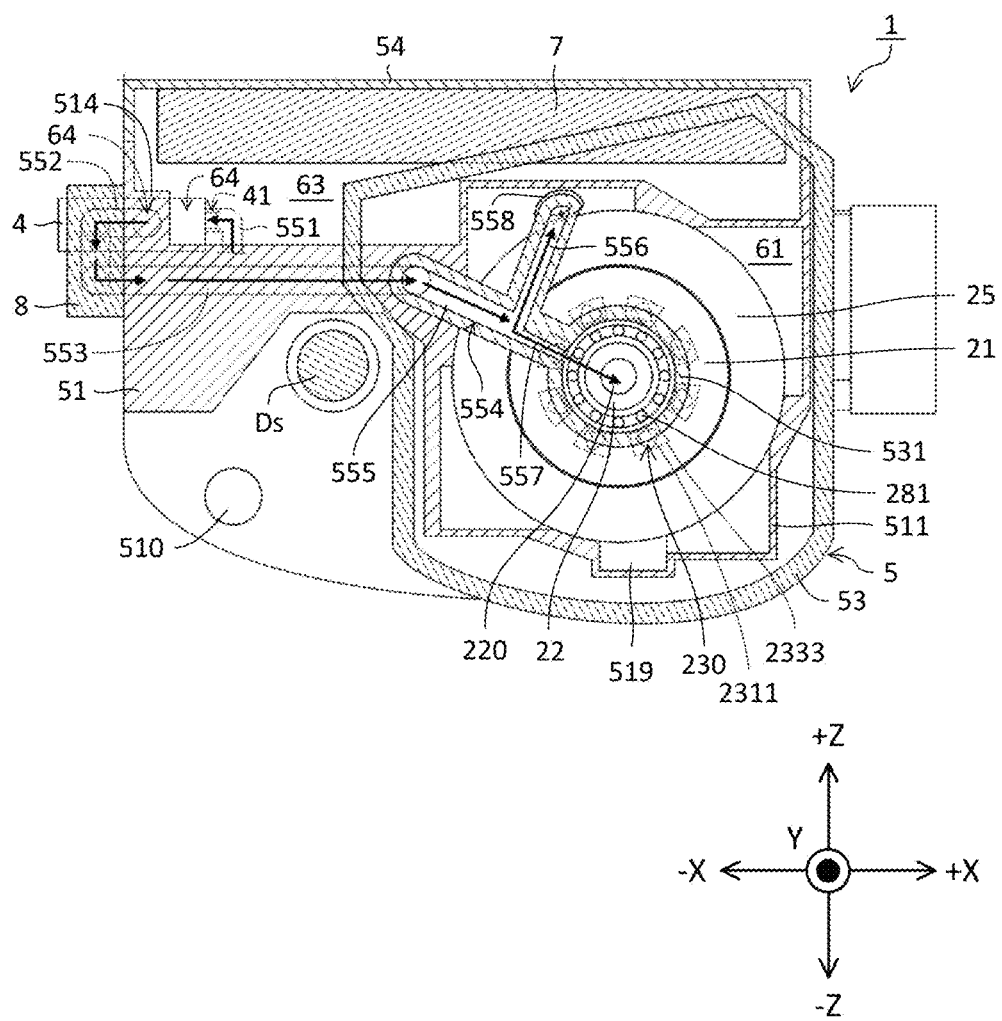
FIG. 3 is a schematic configuration view of the drive device viewed from a Y axis direction.
Figure 4:
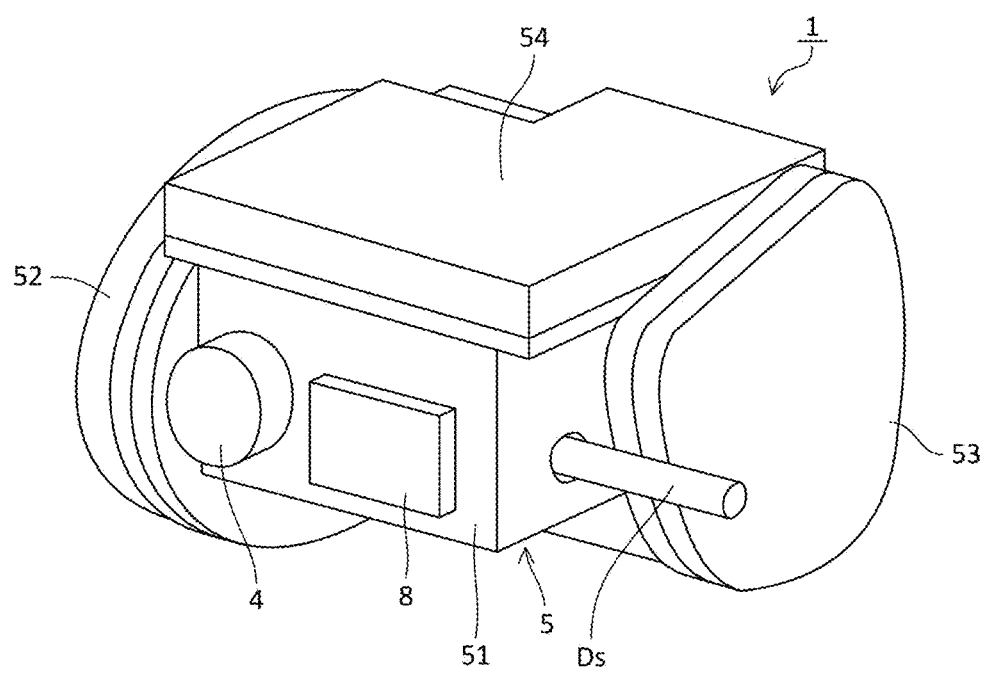
FIG. 4 is a perspective view of the drive device.
Figure 4:
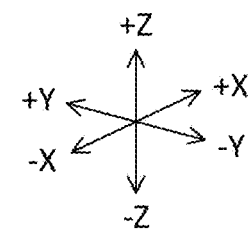

The drive device 1 according to an example embodiment of the present disclosure will be described below with reference to the drawings. FIGS. 1 to 3 are conceptual views of the drive device 1 according to an example embodiment. FIG. 1 is a schematic configuration view of the drive device 1 viewed from the vertical direction. FIG. 2 is a schematic configuration view of the drive device 1 viewed from the X axis direction. FIG. 3 is a schematic configuration view of the drive device 1 viewed from the Y axis direction. FIG. 4 is a perspective view of the drive device 1. Note that FIGS. 1 to 3 are merely conceptual views, and the layout and dimensions of each portion are not necessarily the same as those of the actual drive device 1.

In the present example embodiment, the drive device 1 is mounted on a vehicle. The vehicle includes a hybrid vehicle (HV), a plug-in hybrid vehicle (PHV), and an electric vehicle (EV), and at least a motor is used as a power source. The drive device 1 is used as the power source of the above-described vehicle.

As shown in FIG. 1, the drive device 1 includes the motor 2, a gear portion 3, a pump 4, a housing 5, and an oil cooler 8. The motor 2 includes a rotor 21 having a motor shaft 22 and a stator 25 located radially outward of the rotor 21. The motor shaft 22 is rotatable about the rotation axis J2 extending along the axial direction. The gear portion 3 is connected to one axial end portion (+Y side end portion) of the motor shaft 22. The housing 5 accommodates the motor 2 and the gear portion 3. The pump 4 supplies an oil CL accommodated in the housing 5 to the motor 2. The oil cooler 8 cools the oil CL. The oil cooler 8 cools the oil CL supplied from the pump 4 to the motor 2 in the present example embodiment. The drive device 1 further includes an inverter 7. The inverter 7 supplies drive electric power to the motor 2. The housing 5 further accommodates the inverter 7.

The inside of the housing 5 is provided with an accommodation space that accommodates the motor 2, the gear portion 3, the pump 4, and the inverter 7. As described later, this accommodation space is partitioned into a motor accommodation portion 61 that accommodates the motor 2, a gear accommodation portion 62 that accommodates the gear portion 3, an inverter accommodation portion 63 that accommodates the inverter 7, and a pump accommodation portion 64 that accommodates the pump 4. The inverter 7 is integrally fixed to a fourth housing portion 54 described later.

The motor 2 is accommodated in the motor accommodation portion 61 of the housing 5. The motor 2 includes the rotor 21 and the stator 25.

When electric power is supplied from a battery (not illustrated) to the stator 25, the rotor 21 rotates about the rotation axis J2 extending in the horizontal direction. The rotor 21 includes a motor shaft 22, a rotor core 23, and a rotor magnet 24. The rotor core 23 is fixed to the radial outside surface of the motor shaft 22.

The motor shaft 22 extends about the rotation axis J2 extending in the Y axis direction. The motor shaft 22 rotates about the rotation axis J2. The motor shaft 22 is rotatably supported by a first motor bearing 281 and a second motor bearing 282. The first motor bearing 281 is held by a third housing portion 53 of the housing 5 described later. The second motor bearing 282 is held by a side plate portion 512 of the housing 5 described later.

The motor shaft 22 is a tubular hollow shaft. The motor shaft 22 includes a hollow portion 220, a shaft tubular portion 221 extending in the axial direction, and a shaft hole portion 222. The hollow portion 220 is disposed inside the shaft tubular portion 221. The shaft hole portion 222 penetrates the shaft tubular portion 221 in the radial direction. The motor shaft 22 further includes a recess portion 223. The recess portion 223 is disposed on the inner circumferential surface of the shaft tubular portion 221 at the central portion of the shaft tubular portion 221, is recessed radially outward from this inner circumferential surface, and extends in the circumferential direction. The shaft hole portion 222 is disposed in the bottom surface of the recess portion 223 and penetrates the shaft tubular portion 221 radially outward from the bottom surface of the recess portion 223.

A hollow transmission shaft 310 of the gear portion 3 described later is inserted and connected to one end portion (+Y side) of the motor shaft 22. It is possible to adopt a screw coupling using a male screw and a female screw for connecting the both. Alternatively, the both may be joined by a fixing method such as welding. The hollow portion 220 of the motor shaft 22 communicates with a hollow portion 310a of the transmission shaft 310 described later and a first motor bearing holding portion 531 that accommodates the first motor bearing 281.

The rotor core 23 is a columnar body extending along the axial direction. The rotor core 23 is fixed to the radial outside surface of the motor shaft 22. As mentioned earlier, the rotor 21 has the rotor core 23. A plurality of rotor magnets 24 are fixed to the rotor core 23. The plurality of rotor magnets 24 are aligned along the circumferential direction with the magnetic poles arranged alternately.

The rotor core 23 includes a rotor through hole 230 and a rotor space 2334. The rotor through hole 230 penetrates the rotor core 23 in the axial direction (i.e., the Y axis direction). The rotor space 2334 connects the rotor through hole 230 and the shaft hole portion 222 of the motor shaft 22. The rotor through hole 230 is used as a circulation path for the oil CL that cools the rotor 21 from inside. The oil CL circulating through the hollow portion 220 of the motor shaft 22 can flow into the rotor through hole 230 via the shaft hole portion 222 and the rotor space 2334 as described later.

Figure 5:
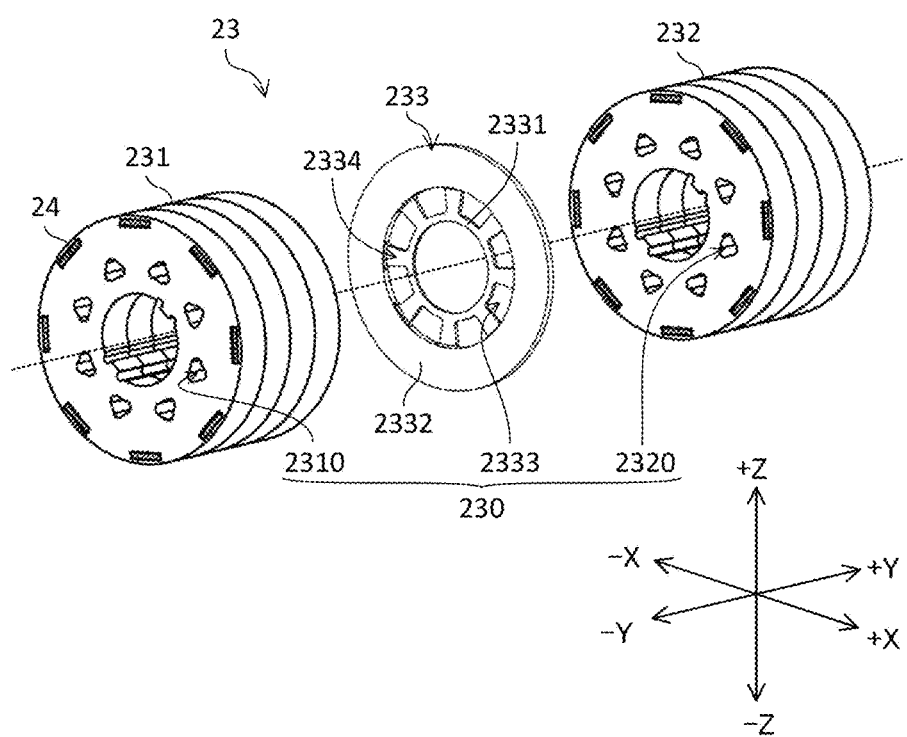
FIG. 5 is a perspective view showing a configuration example of a rotor core according to an example embodiment of the present disclosure.

FIG. 5 is a perspective view showing a configuration example of the rotor core 23. The rotor core 23 includes a first rotor core 231, a second rotor core 232, and an intermediate core 233. The first rotor core 231 has a first rotor through hole 2310 extending in the axial direction. The second rotor core 232 has a second rotor through hole 2320 extending in the axial direction. The intermediate core 233 is disposed between the first rotor core 231 and the second rotor core 232 in the axial direction. The first rotor core 231 and the second rotor core 232 are stacked bodies formed of stacked silicon steel plates. The intermediate core 233 is a silicon steel plate stacked between the first rotor core 231 and the second rotor core 232.

The intermediate core 233 includes an annular first annular portion 2331, an annular second annular portion 2332, and a core opening 2333. The first annular portion 2331 is disposed radially outward of the motor shaft 22. The second annular portion 2332 extends radially outward from the radially outer end portion of the first annular portion 2331. The core opening 2333 penetrates the first annular portion 2331 in the axial direction. In the present example embodiment, a plurality of the core openings 2333 are disposed in the circumferential direction along the radially inner end portion of the first annular portion 2331.

In the axial direction, the thickness of the second annular portion 2332 is greater than the thickness of the first annular portion 2331. Therefore, in the present example embodiment, the rotor space 2334 is disposed between the first annular portion 2331 and the first rotor core 231. However, the present disclosure is not limited to this example, and the rotor space 2334 may be disposed between the first annular portion 2331 and the second rotor core 232, or may be disposed both between the first annular portion 2331 and the first rotor core 231 and between the first annular portion 2331 and the second rotor core 232. That is, the rotor space 2334 is disposed between the first annular portion 2331 and at least one of the first rotor core 231 and the second rotor core 232.

The rotor through hole 230 includes the first rotor through hole 2310, the second rotor through hole 2320, and the core opening 2333. When viewed from the axial direction, the core opening 2333 overlaps at least a part of the first rotor through hole 2310 and at least a part of the second rotor through hole 2320. Accordingly, by appropriately adjusting the area where the core opening 2333 and the first rotor through hole 2310 overlap each other viewed from the axial direction and the area where the core opening 2333 and the second rotor through hole 2320 overlap each other viewed from the axial direction, it is possible to adjust the supply amount of the oil CL (see FIG. 1) supplied from the axial end portion of the rotor through hole 230 to the axial end portion of the stator 25 during rotation of the rotor 21. For example, by preventing the excessive oil CL from being supplied to the axial end portion of the stator 25, the oil CL can hardly enter between the radial outside surface of the rotor 21 and the radial inside surface of the stator 25 from between the axial end portions of the rotor 21 and the stator 25. Therefore, it is possible to suppress or prevent a decrease in the rotation efficiency of the rotor 21 due to frictional resistance of the oil CL entered between the both.

The stator 25 rotationally drives the rotor 21. The stator 25 is disposed radially outward of the rotor 21 and surrounds the rotor 21 from radially outward. That is, the motor 2 is an inner rotor type motor in which the rotor 21 is rotatably disposed inside the stator 25. The stator 25 includes a stator core 26, a coil 27, and an insulator (not illustrated) interposed between the stator core 26 and the coil 27. The stator 25 is held by the housing 5. The stator core 26 has a plurality of magnetic pole teeth (not illustrated) radially inward from an inner circumferential surface of an annular yoke.

A coil wire is wound between the magnetic pole teeth. The coil wire wound around the magnetic pole teeth constitutes the coil 27. The coil wire is connected to the inverter 7 via a bus bar not illustrated. The coil 27 includes a coil end 271 protruding from the axial end surface of the stator core 26. The coil end 271 protrudes in the axial direction relative to the end portion of the rotor core 23 of the rotor 21.

Next, the gear portion 3 transmits drive force of the motor 2 to a drive shaft Ds of the vehicle. The drive shaft Ds drives wheels of the vehicle. Details of the gear portion 3 will be described with reference to the drawings. As shown in FIG. 1 and the like, the gear portion 3 is accommodated in the gear accommodation portion 62 of the housing 5. The gear portion 3 includes a deceleration device 31 and a differential device 32.

The deceleration device 31 is connected to the motor shaft 22. The deceleration device 31 reduces the rotational speed of the motor 2, increases the torque output from the motor 2 according to the reduction ratio, and transmits the increased torque to the differential device 32.

The deceleration device 31 includes the transmission shaft 310, a first gear (intermediate drive gear) 311, a second gear (intermediate gear) 312, a third gear (final drive gear) 313, and an intermediate shaft 314. The torque output from the motor 2 is transmitted to a fourth gear 321 of the differential device 32 via the motor shaft 22, the transmission shaft 310, the first gear 311, the second gear 312, the intermediate shaft 314, and the third gear 313. The gear ratio of each gear, the number of gears, and the like can be variously changed according to the required reduction ratio. The deceleration device 31 is a parallel axis gear type deceleration device in which the axis centers of the gears are disposed in parallel. The motor shaft 22 and the transmission shaft 310 are spline-fitted.

The transmission shaft 310 extends in the Y axis direction about the rotation axis J2 and rotates about the rotation axis J2 together with the motor shaft 22. The motor shaft 22 is rotatably supported by a first gear bearing 341 and a second gear bearing 342. As described later, the first gear bearing 341 is held by the side plate portion 512 of the housing 5. The second gear bearing 342 is held by a second housing portion 52 described later.

The transmission shaft 310 is a hollow shaft provided with the hollow portion 310a having an inner circumferential surface extending along the rotation axis J2 inside thereof. The −Y direction-side end portion of the transmission shaft 310 is connected to the +Y direction-side end portion of the motor shaft 22 as mentioned earlier. Note that the present disclosure is not limited to the example of the present example embodiment, and the transmission shaft 310 may be the same member as the motor shaft 22, that is, may be integrated. In other words, the motor shaft 22 may be a hollow shaft extending across the motor accommodation portion 61 and the gear accommodation portion 62 of the housing 5. In this case, the +Y direction-side end portion of the motor shaft 22 protrudes on the gear accommodation portion 62 side and is rotatably supported by the second gear bearing 342. The hollow portion 220 of the motor shaft 22 communicates with the first motor bearing holding portion 531 that accommodates the first motor bearing 281 and the second gear bearing holding portion 521 that accommodates the second gear bearing 342.

The first gear 311 is provided on the outer circumferential surface of the transmission shaft 310. The first gear 311 may be the same member as or a different member from the transmission shaft 310. When the first gear 311 and the transmission shaft 310 are separate members, the first gear 311 and the transmission shaft 310 are firmly fixed by shrink fitting or the like. The first gear 311 is rotatable about the rotation axis J2 together with the transmission shaft 310.

The intermediate shaft 314 extends along an intermediate axis J4 parallel to the rotation axis J2 and is rotatably supported by the housing 5 about the intermediate axis J4. Both ends of the intermediate shaft 314 are rotatably supported by a third gear bearing 343 and a fourth gear bearing 344. The third gear bearing 343 is held by the side plate portion 512 of the housing 5. The fourth gear bearing 344 is held by the second housing portion 52.

The second gear 312 and the third gear 313 are provided on the outer circumferential surface of the intermediate shaft 314. The second gear 312 and the third gear 313 may be the same members as or different members from the intermediate shaft 314. When the second gear 312 and the intermediate shaft 314 are separate members, they are firmly fixed by shrink fitting or the like. When the third gear 313 and the intermediate shaft 314 are separate members, they are firmly fixed by shrink fitting or the like. The third gear 313 is disposed closer to the side plate portion 512 than the second gear 312 (i.e., in the −Y direction).

The second gear 312 and the third gear 313 are connected to each other with the intermediate shaft 314 interposed therebetween. The second gear 312 and the third gear 313 are rotatable about the intermediate axis J4. The second gear 312 meshes with the first gear 311. The third gear 313 meshes with the fourth gear 321 of the differential device 32.

The torque of the transmission shaft 310 is transmitted from the first gear 311 to the second gear 312. The torque transmitted to the second gear 312 is transmitted to the third gear 313 via the intermediate shaft 314. The torque transmitted to the third gear 313 is transmitted to the fourth gear 321 of the differential device 32. In this manner, the deceleration device 31 transmits, to the differential device 32, the torque output from the motor 2.

The differential device 32 is attached to the drive shaft Ds. The differential device 32 transmits the output torque of the motor 2 to the drive shaft Ds. The drive shaft Ds is attached to each of the right and left sides of the differential device 32. The differential device 32 has a function of transmitting the same torque to the right and left drive shafts Ds while absorbing a speed difference between the right and left wheels (drive shaft Ds) when the vehicle turns, for example. The differential device 32 includes, for example, the fourth gear (ring gear) 321, a gear housing (not illustrated), a pair of pinion gears (not illustrated), a pinion shaft (not illustrated), and a pair of side gears (not illustrated).

The fourth gear 321 is rotatable about a differential axis J5 parallel to the rotation axis J2. Torque output from the motor 2 is transmitted to the fourth gear 321 via the deceleration device 31.

Next, the pump 4 is an electric pump driven by electricity, and is connected to the inverter 7 via a harness cable (not illustrated). That is, the pump 4 is driven by the inverter 7. As the pump 4, a trochoidal pump, a centrifugal pump, or the like can be employed. The pump 4 is provided in the pump accommodation portion 64 formed in the housing 5. For example, the pump 4 is fixed to the housing 5 with a bolt (not illustrated).

A suction port 41 of the pump 4 is inserted into a first oil passage 551 so as to close the first oil passage 551. The suction port 41 of the pump 4 is connected to a strainer 42 via the first oil passage 551 described later. The strainer 42 is disposed in the gear accommodation portion 62 of the housing 5. The strainer 42 is located in an oil pool P (see FIG. 2 and the like) of the gear accommodation portion 62 described later. The strainer 42 sucks the oil CL by drive of the pump 4 from an inlet (not illustrated) disposed on the lower surface thereof and supplies the oil CL to the suction port 41 of the pump 4. A filtration structure (not illustrated) such as a filter is attached to the strainer 42. By attaching the filtration structure, it is possible to suppress mixing of foreign matters into the pump 4 and mixing of foreign matters into the motor 2.

A discharge port 43 of the pump 4 opens to the pump accommodation portion 64. That is, the oil CL protruding from the pump 4 fills the pump accommodation portion 64. A second oil passage 552 described later is connected to the pump accommodation portion 64. The pump 4 discharges the oil CL sucked from the suction port 41 from the discharge port 43 and sends the oil CL to the oil cooler 8 via the second oil passage 552.

The oil cooler 8 performs heat exchange between the oil CL sent from the pump 4 via the second oil passage 552 and a refrigerant RE supplied in a system different from an oil passage 55 described later including the second oil passage 552. Thus, the oil cooler 8 cools the oil CL sent from the pump 4. The oil CL cooled by the oil cooler 8 is supplied to the motor 2 via a third oil passage 553 and a fourth oil passage 554 described later. The refrigerant RE is supplied to the oil cooler 8 after cooling an IGBT, an SIC element, and the like (not illustrated) of the inverter 7.

Figure 6:
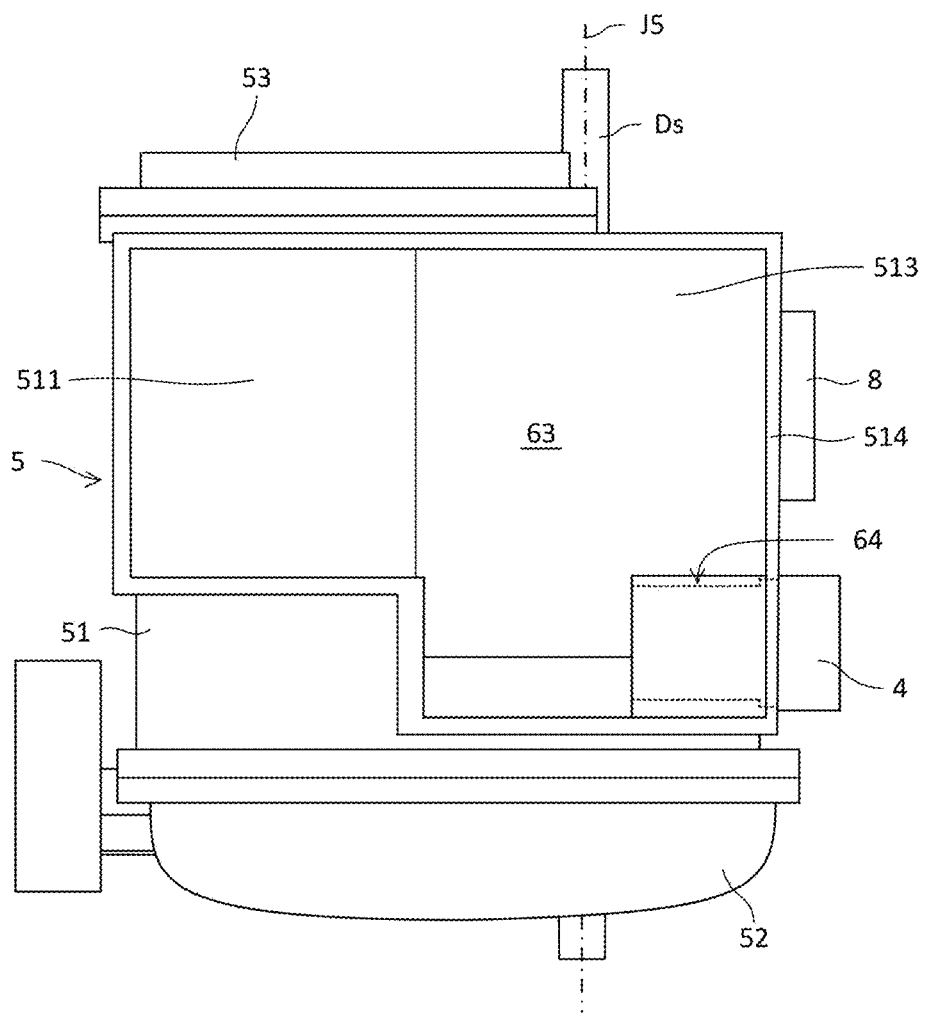
FIG. 6 is a top view of an inverter accommodation portion according to an example embodiment of the present disclosure viewed from vertically above to vertically below.

The pump accommodation portion 64 is formed in a peripheral wall portion 514 surrounding the inverter accommodation portion 63 (see FIG. 6). For example, the pump accommodation portion 64 can be disposed using a dead space other than the space occupied by the inverter 7 in the inverter accommodation portion 63. This allows the pump 4 to be compactly disposed, which can contribute to downsizing of the drive device 1.

Preferably, the pump 4 is disposed between the fourth housing portion 54 and the drive shaft Ds. For example, in the vertical direction, the pump 4 is disposed closer to the drive shaft Ds (i.e., vertically downward) in the vertical direction than the fourth housing portion 54 and closer to the fourth housing portion 54 (i.e., vertically upward) in the vertical direction than the drive shaft Ds. Thus, the pump 4 can be disposed in an empty space between the drive shaft Ds and the fourth housing portion 54 in the vertical direction. Therefore, it is possible to contribute to downsizing of the drive device 1 in the vertical direction. Furthermore, there is no interference with an attachment portion 510 to the vehicle provided in the first housing portion 51.

In the front-rear direction (i.e., the X axis direction) perpendicular to the axial direction, the pump 4 and the oil cooler 8 are disposed at one end portion of the housing 5 in the front-rear direction. The motor accommodation portion 61 is disposed at a portion on the other side in the front-rear direction of the housing 5. For example, in the present example embodiment, the pump 4 and the oil cooler 8 are disposed at the rear end portion (i.e., the −X direction-side end portion) of the housing 5, and the motor accommodation portion 61 is disposed at the front portion (i.e., the +X direction side) of the housing 5. In this case, the pump 4 and the oil cooler 8 are disposed at the end portions in the front-rear direction, and it is therefore possible to suppress an increase in size of the drive device 1 in the axial direction. In addition, the pump 4 and the oil cooler 8 are provided on the housing 5 on the side opposite to the motor accommodation portion 61 in the front-rear direction, and thus the pump 4 and the oil cooler 8 can be disposed away from the motor accommodation portion 61. Therefore, the pump 4 and the oil cooler 8 can be disposed without greatly increasing the size of the drive device 1 in the front-rear direction. Furthermore, an oil passage or the like can be relatively freely disposed between the pump 4 and the oil cooler 8 and the motor accommodation portion 61.

Figure 7:
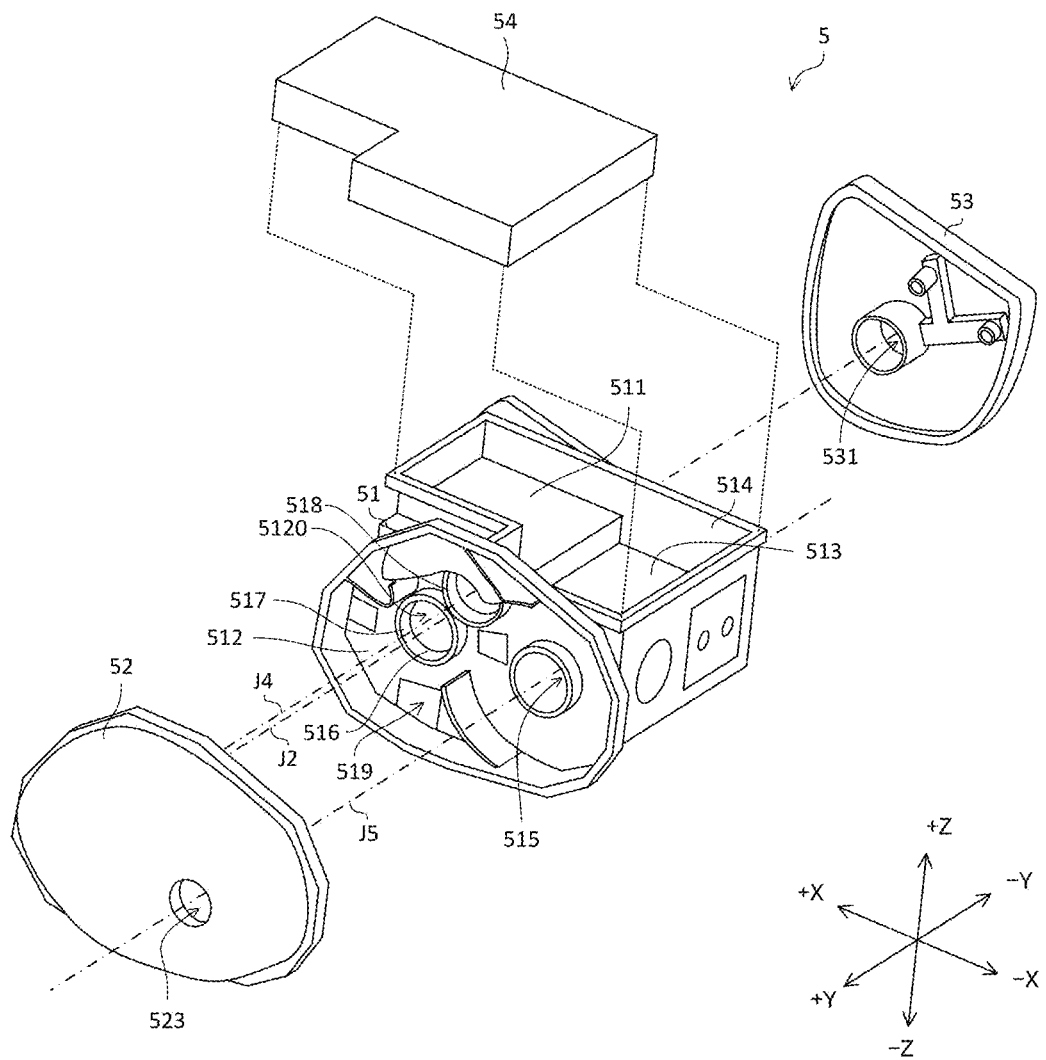
FIG. 7 is an exploded perspective view of a housing according to an example embodiment of the present disclosure.

Next, the configuration of the housing 5 will be described. FIG. 7 is an exploded view of the housing 5. As shown in FIG. 7, the housing 5 includes a first housing portion 51, a second housing portion 52, and a third housing portion 53. The first housing portion 51 includes a tubular portion 511 extending in the axial direction parallel to the rotation axis J2, the side plate portion 512 covering one axial end portion of the tubular portion 511, and the pump accommodation portion 64 accommodating the pump 4. The second housing portion 52 is attached to one axial end portion (+Y direction-side end portion) of the side plate portion 512. The third housing portion 53 closes the other axial end portion (−Y direction-side end portion) of the tubular portion 511. In other words, the third housing portion 53 is disposed at the other axial end portion (−Y direction-side end portion) of the first housing portion 51. That is, the third housing portion 53 closes the opening of the tubular first housing portion 51. The housing 5 further includes the fourth housing portion 54. The fourth housing portion 54 is disposed vertically above the tubular portion 511. The vertically upward direction is perpendicular to the axial direction. The fourth housing portion 54 is attached to an upper portion of the first housing portion 51.

The housing 5 further includes the motor accommodation portion 61 and the gear accommodation portion 62. The motor accommodation portion 61 is a space surrounded by the tubular portion 511, the side plate portion 512, and the third housing portion 53, and accommodates the motor 2. The gear accommodation portion 62 is a space surrounded by the side plate portion 512 and the second housing portion 52, and accommodates the gear portion 3. The motor accommodation portion 61 and the gear accommodation portion 62 are partitioned by the side plate portion 512.

The housing 5 further includes the inverter accommodation portion 63 that accommodates the inverter 7. The inverter accommodation portion 63 is a space surrounded by the tubular portion 511, a plate portion 513 described later, the peripheral wall portion 514 described later, and the fourth housing portion 54. The inverter 7 is integrally fixed to the fourth housing portion 54. That is, the inverter 7 is fixed downward to the inverter accommodation portion 63 by integrally fixing the inverter 7 to the lower side of the fourth housing portion 54. The fourth housing portion 54 may be provided with an inverter cooling path (not illustrated).

The housing 5 further includes the pump accommodation portion 64 that accommodates the pump 4. The pump accommodation portion 64 is formed in the first housing portion 51. That is, the first housing portion 51 includes the pump accommodation portion 64.

The tubular portion 511 has a tubular shape extending in the axial direction. The motor 2 is accommodated in the tubular portion 511. That is, the space inside the tubular portion 511 constitutes the motor accommodation portion 61. In the present example embodiment, the tubular portion 511 and the side plate portion 512 are the identical member. However, the present disclosure is not limited to this example, and the tubular portion 511 and the side plate portion 512 may be different members.

The first housing portion 51 further includes the plate portion 513 and the peripheral wall portion 514 that surrounds the inverter accommodation portion 63. The plate portion 513 expands from the tubular portion 511 along one side (+Y direction) in the right-left direction. The right-left direction is a direction perpendicular to the axial direction and intersecting the vertical direction. The peripheral wall portion 514 protrudes upward (+Z direction) from the upper end portion of the tubular portion 511 and the plate portion 513, and surrounds the inverter accommodation portion 63 when viewed from the vertical direction (see FIG. 6).

The first housing portion 51 further includes an insertion hole 5120, a first drive shaft passage hole 515, a second motor bearing holding portion 516, a first gear bearing holding portion 517, a third gear bearing holding portion 518, and a side plate opening 519.

The insertion hole 5120 and the first drive shaft passage hole 515 are disposed in the side plate portion 512 and penetrate the side plate portion 512 in the Y axis direction. The center of the insertion hole 5120 coincides with the rotation axis J2. The second motor bearing holding portion 516 is disposed in the insertion hole 5120.

The drive shaft Ds penetrates the first drive shaft passage hole 515 in a rotatable state. A second drive shaft passage hole 523 is disposed in the second housing portion 52. The second drive shaft passage hole 523 is a hole penetrating the second housing portion 52 in the axial direction. The drive shaft Ds penetrates the second drive shaft passage hole 523 in a rotatable state. The second drive shaft passage hole 523 overlaps the first drive shaft passage hole 515 when viewed from the axial direction. Consequently, the drive shaft Ds disposed at both ends in the axial direction (Y direction) of the differential device 32 rotates about the differential axis J5. An oil seal (not illustrated) is provided between the drive shaft Ds and the first drive shaft passage hole 515 and between the drive shaft Ds and the second drive shaft passage hole 523 in order to suppress leakage of the oil CL. An axle (not illustrated) that rotates the wheel is connected to a front end of the drive shaft Ds.

The second motor bearing holding portion 516 extends in the −Y direction from the edge portion of the insertion hole 5120. An outer ring of the second motor bearing 282 is fixed to the second motor bearing holding portion 516. The +Y direction-side end portion of the motor shaft 22 is fixed to the inner ring of the second motor bearing 282. The first motor bearing holding portion 531 is disposed on the +Y direction side of the third housing portion 53. The central axes of the first motor bearing holding portion 531 and the second motor bearing holding portion 516 each coincide with the rotation axis J2. An outer ring of the first motor bearing 281 is fixed to the first motor bearing holding portion 531. The −Y direction-side end portion of the motor shaft 22 is fixed to the inner ring of the first motor bearing 281. As a result, both ends of the rotor 21 in the Y axis direction of the motor 2 are rotatably supported by the housing 5 via the first motor bearing 281 and the second motor bearing 282.

The first gear bearing holding portion 517 extends in the +Y direction from the edge portion of the insertion hole 5120. An outer ring of the first gear bearing 341 is fixed to the first gear bearing holding portion 517. The −Y direction-side end portion of the transmission shaft 310 is fixed to the inner ring of the first gear bearing 341. The second gear bearing holding portion 521 is disposed on the −Y direction side of the second housing portion 52. The central axes of the second gear bearing holding portion 521 and the first gear bearing holding portion 517 coincide with the rotation axis J2. An outer ring of the second gear bearing 342 is fixed to the second gear bearing holding portion 521. The transmission shaft 310 is fixed to the inner ring of the second gear bearing 342. As a result, the transmission shaft 310 is rotatably supported by the side plate portion 512 of the housing 5 and the second housing portion 52 via the first gear bearing 341 and the second gear bearing 342.

Next, the third gear bearing holding portion 518 has a tubular shape extending in the +Y direction from the side plate portion 512. The third gear bearing holding portion 518 is disposed in the +X direction and the +Z direction with respect to the first gear bearing holding portion 517. An outer ring of the third gear bearing 343 is fixed to the third gear bearing holding portion 518. The intermediate shaft 314 is fixed to the inner ring of the third gear bearing 343. The fourth gear bearing holding portion 522 is disposed on the +Y direction side of the second housing portion 52. The fourth gear bearing holding portion 522 has a tubular shape extending in the −Y direction from the second housing portion 52. The central axes of the third gear bearing holding portion 518 and the fourth gear bearing holding portion 522 coincide with the intermediate axis J4. An outer ring of the fourth gear bearing 344 is fixed to the fourth gear bearing holding portion 522. The +Y direction-side end portion of the intermediate shaft 314 is fixed to the inner ring of the fourth gear bearing 344. As a result, the intermediate shaft 314 is rotatably supported by the side plate portion 512 of the housing 5 and the second housing portion 52 via the third gear bearing 343 and the fourth gear bearing 344.

The side plate opening 519 is provided in the side plate portion 512 that partitions the motor accommodation portion 61 and the gear accommodation portion 62. The housing 5 includes the side plate opening 519. The side plate opening 519 penetrates the side plate portion 512 in the axial direction and connects the motor accommodation portion 61 and the gear accommodation portion 62. The side plate opening 519 causes in particular the lower portion of the motor accommodation portion 61 and the lower portion of the gear accommodation portion 62 to communicate with each other. The side plate opening 519 allows the oil CL accumulated in the lower portion in the motor accommodation portion 61 to move to the gear accommodation portion 62. The oil CL having moved to the gear accommodation portion 62 can flow into the oil pool P.

Next, the configuration of the second housing portion 52 will be described. The second housing portion 52 is attached to the +Y direction side plate portion 512 side of the first housing portion 51. The second housing portion 52 has a recessed shape that is open to the side plate portion 512 side. The opening of the second housing portion 52 is covered with the side plate portion 512. As shown in FIG. 1 and the like, the second housing portion 52 includes the second gear bearing holding portion 521, the fourth gear bearing holding portion 522, and the second drive shaft passage hole 523. Since these descriptions have been made previously, they are omitted here.

The second housing portion 52 may include an oil storage portion (not illustrated) that stores the oil CL. The oil CL is supplied from the oil storage portion not illustrated to the second gear bearing holding portion 521 and the fourth gear bearing holding portion 522, and the oil CL is supplied to the second gear bearing 342 held by the second gear bearing holding portion 521 and the fourth gear bearing 344 held by the fourth gear bearing holding portion 522 for lubrication.

The oil pool P in which the oil CL accumulates is disposed in a lower portion in the gear accommodation portion 62. A part of the differential device 32 is immersed in the oil pool P. The oil CL accumulated in the oil pool P is scraped up by the operation of the differential device 32, and supplied to the inside of the gear accommodation portion 62. For example, the oil CL is scraped up by the tooth surface of the fourth gear 321 when the fourth gear 321 of the differential device 32 rotates. The oil CL diffused in the gear accommodation portion 62 is supplied to each gear of the deceleration device 31 and the differential device 32 in the gear accommodation portion 62 to spread the oil CL over the tooth surface of the gear, and used for lubrication. A part of the oil CL diffused in the gear accommodation portion 62 is supplied to each of the first gear bearing 341 to the fourth gear bearing 344, and used for lubrication.

Next, for example, as shown in FIGS. 1 to 3, the housing 5 further includes the oil passage 55 through which the oil CL flows. The oil passage 55 is a flow path through which the oil CL sucked up from the oil pool P of the gear accommodation portion 62 by the pump 4 and cooled by the oil cooler 8 flows toward the motor 2.

The oil passage 55 includes the first oil passage 551, the second oil passage 552, the third oil passage 553, and the fourth oil passage 554. The first oil passage 551 connects the gear accommodation portion 62 and the pump accommodation portion 64. Specifically, as mentioned earlier, the first oil passage 551 connects the gear accommodation portion 62 and the suction port 41 of the pump 4, and particularly connects the vertically lower portion of the gear accommodation portion 62 and the suction port 41 of the pump 4. For example, in the present example embodiment, the first oil passage 551 is directly connected to the suction port 41 of the pump 4. However, the present disclosure is not limited to this example, and the first oil passage 551 may be indirectly connected to the suction port 41 via a predetermined space such as a part of the pump accommodation portion 64. The first oil passage 551 connects the pump accommodation portion 64 and the oil cooler 8. Specifically, the second oil passage 552 connects the discharge port 43 of the pump 4 and the oil cooler 8, and supplies the oil CL discharged from the pump 4 to the oil cooler 8. For example, in the present example embodiment, the first oil passage 551 is indirectly connected to the discharge port 43 via another part of the pump accommodation portion 64. However, the present disclosure is not limited to this example, and the first oil passage 551 may be directly connected to the discharge port 43 of the pump 4. The third oil passage 553 connects the oil cooler 8 and the fourth oil passage 554. The fourth oil passage 554 is formed in the third housing portion 53. The fourth oil passage 554 connects the third oil passage 553 and the motor accommodation portion 61.

The first oil passage 551, the second oil passage 552, and the third oil passage 553 are formed in the first housing portion 51. For example, in the present example embodiment, the first oil passage 551 is formed inside the side plate portion 512, that is, formed at a different position of the same member as the side plate portion 512. Each of the second oil passage 552 and the third oil passage 553 is formed inside the peripheral wall portion 514, that is, formed at different positions of the same member as the peripheral wall portion 514. The fourth oil passage 554 is formed in the third housing portion 53. Accordingly, it is not necessary to dispose a pipe through which the oil CL flows outside the housing 5, and thus it is possible to prevent an increase in size of the drive device 1. Therefore, it is possible to provide the drive device 1 in which the oil passage 55 of the oil CL is compactly disposed. Each of the first oil passage 551 to the fourth oil passage 554 is drilled by a drill, an end mill, or the like.

The present disclosure is not limited to the example of the present example embodiment, and the second oil passage 552 and the third oil passage 553 may be formed inside the plate portion 513. That is, each of the second oil passage 552 and the third oil passage 553 may be the same member as either the plate portion 513 or the peripheral wall portion 514. Thus, the second oil passage 552 and the third oil passage 553 are not separate members from the first housing portion 51, and hence the number of components of the drive device 1 can be reduced. Therefore, the drive device 1 becomes easy to assemble. Furthermore, the productivity can be improved by reduction of the manufacturing cost of the drive device 1.

Preferably, the oil passage 55 further includes a connection pipe 5530. The connection pipe 5530 is disposed on an inner surface of one oil passage of the third oil passage 553 and the fourth oil passage 554 at a connection portion between the third oil passage 553 and the fourth oil passage 554, and is fitted into the other oil passage. Due to the fitting of the connection pipe 5530 at the connection portion, the third oil passage 553 and the fourth oil passage 554 can be easily positioned when the third housing portion 53 is attached to the first housing portion 51. Furthermore, the connection pipe 5530 covers the inside of the connection portion between the both, whereby the leakage of the oil CL at the connection portion can be more reliably prevented.

For example, in the present example embodiment, in the connection portion described above, one end portion of the connection pipe 5530 is disposed on the inner surface of the third oil passage 553. The other end portion of the connection pipe 5530 is fitted into the inner surface of the fourth oil passage 554. The connection pipe 5530 is the same member as the third oil passage 553. Alternatively, one end portion of the connection pipe 5530 may be disposed on the inner surface of the fourth oil passage 554, and the other end portion may be fitted into the inner surface of the third oil passage 553. The connection pipe 5530 may be the same member as the fourth oil passage 554. However, the present disclosure is not limited to these examples, and the connection pipe 5530 may be a member different from the third oil passage 553 and the fourth oil passage 554.

Next, the fourth oil passage 554 is connected to an oil supply portion 558 and the hollow portion 220 of the motor shaft 22. The oil supply portion 558 is connected to the fourth oil passage 554 and supplies the oil CL to the radial outside surface of the stator 25. The drive device 1 further includes the oil supply portion 558. Specifically, the oil supply portion 558 is a tubular member extending in the axial direction. The oil supply portion 558 is accommodated in the motor accommodation portion 61 together with the motor 2 and is disposed above the stator 25. The oil supply portion 558 has a plurality of dispersion holes 5580 penetrating the inner wall. Each of the dispersion holes 5580 opens toward the stator 25 and disperses the oil CL supplied from the fourth oil passage 554 toward the stator 25. Therefore, the stator 25 can be cooled from its radial outside surface by the oil CL supplied from the oil supply portion 558.

On the other hand, the hollow portion 220 of the motor shaft 22 is connected to the rotor through hole 230 of the rotor core 23. For example, the hollow portion 220 of the motor shaft 22 is connected to the rotor through hole 230 via the recess portion 223, the shaft hole portion 222, and the rotor space 2334 (see FIG. 5). That is, the rotor through hole 230 is connected to the fourth oil passage 554 via the hollow portion 220. Therefore, when the rotor 21 rotates, the oil CL is supplied from the axial end portion of the rotor through hole 230 to the axial end portion of the stator 25. Thus, the axial end portion of the stator 25 can be cooled by the oil CL supplied from the rotor through hole 230, and in particular, the coil end of the stator 25 can be cooled.

The fourth oil passage 554 includes a first supply passage 555, a tubular second supply passage 556, and a tubular third supply passage 557. The first supply passage 555 is connected to the third oil passage 553. The second supply passage 556 connects the first supply passage 555 and the oil supply portion 558. The third supply passage 557 connects the first supply passage 555 and the hollow portion 220 of the motor shaft 22. That is, one end portion of the fourth oil passage 554 is the first supply passage 555, and the other end portion of the fourth oil passage 554 branches into the second supply passage 556 and the third supply passage 557. Preferably, the inner diameter of the second supply passage 556 is larger than the inner diameter of the third supply passage 557. Specifically, the minimum inner diameter of the second supply passage 556 is larger than the minimum inner diameter of the third supply passage 557. Thus, the amount of the oil CL supplied to the oil supply portion 558 can be made larger than the amount of the oil CL supplied to the hollow portion 220 of the motor shaft 22. Therefore, more oil CL can be supplied to the radial outside surface of the stator 25 than to the axial end portion of the stator 25 such as the coil end 271. Therefore, it is possible to improve the cooling efficiency of the stator 25 by the oil CL cooled by the oil cooler 8.

The oil CL having cooled the motor 2 accumulates in the lower portion of the motor accommodation portion 61 and then flows to the oil pool P in the lower portion of the gear accommodation portion 62 through the side plate opening 519. That is, the oil CL supplied from the second supply passage 556 to the radial outside surface of the stator 25 via the oil supply portion 558 and having cooled the stator 25 accumulates in the lower portion of the motor accommodation portion 61, and then flows to the oil pool P in the lower portion of the gear accommodation portion 62 through the side plate opening 519. The oil CL supplied from the third supply passage 557 to the coil end 271 and the like via the rotor through hole 230 accumulates in the lower portion of the motor accommodation portion 61, and then flows to the oil pool P in the lower portion of the gear accommodation portion 62 through the side plate opening 519.

More preferably, the inner diameter of the second supply passage 556 is larger than about 1.6 times the inner diameter of the third supply passage 557. For example, in the present example embodiment, the inner diameter of the second supply passage 556 is φ7 mm, and the inner diameter of the third supply passage 557 is φ0.5 mm.

Note that the above-described example does not exclude a configuration in which the inner diameter of the second supply passage 556 is equal to or smaller than the inner diameter of the third supply passage 557.

Figure 8:
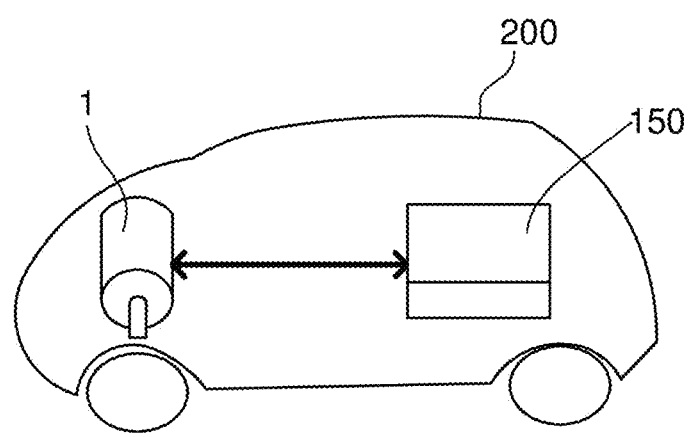
FIG. 8 is a schematic view showing an example of a vehicle according to an example embodiment of the present disclosure having the drive device.

FIG. 8 is a schematic view showing an example of a vehicle 200 having the drive device 1. FIG. 8 conceptually illustrates the drive device 1. The vehicle 200 has the drive device 1. In the example of the vehicle 200, the drive device 1 drives the right and left front wheels. In addition, the vehicle 200 includes a battery 150. The battery 150 stores electric power to be supplied to the drive device 1. The drive device 1 is only required to drive at least any of the wheels. Such the vehicle 200 can be mounted with the drive device 1 in which the oil passage 55 of the oil CL is compactly disposed. This contributes to downsizing of the vehicle. Furthermore, since the drive device 1 can be disposed in a space-saving manner, it is possible to further expand the space in the vehicle that can be used by the passenger of the vehicle.

An example embodiment of the present disclosure has been described above. Note that the scope of the present disclosure is not limited to the above example embodiment. The present disclosure can be implemented by making various modifications to the above-described example embodiment without departing from the gist of the disclosure. In addition, the matters described in the above example embodiment can be discretionarily combined together as appropriate within a range where no inconsistency occurs.

The present disclosure is useful for a drive motor for a vehicle such as a hybrid vehicle (HV), a plug-in hybrid vehicle (PHV), and an electric vehicle (EV).

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A drive device comprising:
a motor that includes a rotor including a motor shaft rotatable about a rotation axis extending along a horizontal direction, and a stator located radially outward of the rotor;
a gear portion that is connected to one axial end portion of the motor shaft;
a housing that accommodates the motor and the gear portion;
a pump to supply oil accommodated in the housing to the motor; and
an oil cooler to cool the oil; wherein
the housing includes:
a first housing portion that includes a tubular portion extending in an axial direction parallel to the rotation axis, a side plate portion covering one axial end portion of the tubular portion, and a pump accommodation portion accommodating the pump;
a second housing portion that is attached to one axial end portion of the side plate portion;
a third housing portion that closes another axial end portion of the tubular portion;
a motor accommodation portion that is a space surrounded by the tubular portion, the side plate portion, and the third housing portion and accommodates the motor;
a gear accommodation portion that is a space surrounded by the side plate portion and the second housing portion and accommodates the gear portion;
a side plate opening that penetrates the side plate portion in an axial direction and connects the motor accommodation portion and the gear accommodation portion; and
an oil passage through which the oil flows;
the oil passage includes a first oil passage, a second oil passage, a third oil passage, and a fourth oil passage;
the first oil passage connects the gear accommodation portion and the pump accommodation portion;
the second oil passage connects the pump accommodation portion and the oil cooler;
the third oil passage connects the oil cooler and the fourth oil passage;
the fourth oil passage connects the third oil passage and the motor accommodation portion;
each of the first oil passage, the second oil passage, and the third oil passage is in the first housing portion; and
the fourth oil passage is in the third housing portion.
2. The drive device according to claim 1, further comprising:
an inverter to supply drive power to the motor, wherein the housing further includes:
a fourth housing portion that is vertically above the tubular portion; and
an inverter accommodation portion that accommodates the inverter;
the first housing portion further includes:
a plate portion; and
a peripheral wall portion that surrounds the inverter accommodation portion;
the inverter accommodation portion is a space surrounded by the tubular portion, the plate portion, the peripheral wall portion, and the fourth housing portion; and each of the second oil passage and the third oil passage are included in a same structure as one of the plate portion and the peripheral wall portion.

3. The drive device according to claim 2, wherein
the inverter is integrally fixed to a fourth housing portion; and
the pump accommodation portion is in a peripheral wall portion surrounding the inverter accommodation portion.

4. The drive device according to claim 3 to be mounted on a vehicle, wherein
the gear portion transmits drive force of the motor to a drive shaft of the vehicle; and
the pump is between the fourth housing portion and the drive shaft.

5. The drive device according to claim 1, wherein
in a front-rear direction perpendicular to an axial direction;
the pump and the oil cooler are at one end portion in a front-rear direction of the housing; and
the motor accommodation portion is in a portion on another side in a front-rear direction of the housing.

6. The drive device according to claim 1, wherein
the oil passage further includes a connection pipe; and
the connection pipe is on an inner surface of one oil passage of the third oil passage and the fourth oil passage at a connection portion between the third oil passage and the fourth oil passage, and the connection pipe is fitted into another oil passage.

7. The drive device according to claim 1 further comprising:
an oil supply portion that is connected to the fourth oil passage to supply the oil to a radial outside surface of the stator; wherein
the motor shaft includes:
a shaft tubular portion extending in an axial direction;
a hollow portion inside the shaft tubular portion; and
a shaft hole portion radially penetrating the shaft tubular portion;
the rotor includes a rotor core fixed to a radial outside surface of the motor shaft;
the rotor core includes:
a rotor through hole axially penetrating the rotor core; and
a rotor space connecting the rotor through hole and the shaft hole portion;
the rotor through hole is connected to the fourth oil passage via the hollow portion; and
the oil is supplied from an axial end portion of the rotor through hole to an axial end portion of the stator when the rotor rotates.

8. The drive device according to claim 7, wherein
the rotor core includes:
a first rotor core including a first rotor through hole extending in an axial direction;
a second rotor core having a second rotor through hole extending in an axial direction; and
an intermediate core between the first rotor core and the second rotor core in an axial direction;
the intermediate core includes:
an annular first annular portion radially outward of the motor shaft;
an annular second annular portion extending radially outward from a radially outer end portion of the first annular portion; and
a core opening penetrating the first annular portion;
a thickness of the second annular portion is greater than a thickness of the first annular portion in an axial direction;
the rotor space is between the first annular portion and at least one of the first rotor core and the second rotor core;
the rotor through hole includes the first rotor through hole, the second rotor through hole, and the core opening; and
the core opening overlaps at least a portion of the first rotor through hole and at least a portion of the second rotor through hole when viewed from an axial direction.

9. The drive device according to claim 7, wherein
the fourth oil passage includes:
a first supply passage connected to the third oil passage;
a second supply passage having a tubular shape and connecting the first supply passage and the oil supply portion; and
a third supply passage having a tubular shape and connecting the first supply passage and the hollow portion of the motor shaft; and
an inner diameter of the second supply passage is larger than an inner diameter of the third supply passage.

10. The drive device according to claim 9, wherein an inner diameter of the second supply passage is larger than about 1.6 times an inner diameter of the third supply passage.

11. A vehicle including the drive device according to claim 1.

* * * * *